US008036420B2

(12) United States Patent
Evans et al.

(10) Patent No.: US 8,036,420 B2
(45) Date of Patent: Oct. 11, 2011

(54) SUBSTITUTING OR REPLACING COMPONENTS IN SOUND BASED ON STEGANOGRAPHIC ENCODING

(75) Inventors: Douglas B. Evans, San Francisco, CA (US); William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 12/853,964

(22) Filed: Aug. 10, 2010

(65) Prior Publication Data

US 2011/0046959 A1 Feb. 24, 2011

Related U.S. Application Data

(63) Continuation of application No. 12/107,484, filed on Apr. 22, 2008, now Pat. No. 7,773,770, which is a continuation of application No. 11/739,534, filed on Apr. 24, 2007, now Pat. No. 7,362,879, which is a continuation of application No. 11/145,515, filed on Jun. 3, 2005, now Pat. No. 7,209,573, which is a continuation of application No. 10/448,544, filed on May 29, 2003, now Pat. No. 6,917,691, which is a continuation of application No. 09/473,396, filed on Dec. 28, 1999, now Pat. No. 6,577,746.

(51) Int. Cl.
*G06K 9/00* (2006.01)
(52) U.S. Cl. ...................................................... 382/100
(58) Field of Classification Search .................. 382/100, 382/112, 232, 305, 306; 358/1.13, 1.18, 358/3.28; 705/75, 76; 713/176; 380/236, 380/237, 238; 386/249
See application file for complete search history.

(56) References Cited

U.S. PATENT DOCUMENTS

| 3,406,344 | A | 10/1968 | Hopper |
| 3,919,479 | A | 11/1975 | Moon et al. |
| 3,950,782 | A | 4/1976 | Carey et al. |
| 3,984,624 | A | 10/1976 | Waggener |
| 4,025,851 | A | 5/1977 | Haselwood et al. |
| 4,230,990 | A | 10/1980 | Lert, Jr. et al. |
| 4,284,846 | A | 8/1981 | Marley |
| 4,313,197 | A | 1/1982 | Maxemchuk |
| 4,450,531 | A | 5/1984 | Kenyon et al. |
| 4,677,466 | A | 6/1987 | Lert, Jr. et al. |
| 4,697,209 | A | 9/1987 | Kiewit et al. |
| 4,703,476 | A | 10/1987 | Howard |

(Continued)

FOREIGN PATENT DOCUMENTS

EP 493 091 7/1992

(Continued)

OTHER PUBLICATIONS

Anonymous, NL-KR Digest, Oct. 3, 1988, 9 pages.

(Continued)

*Primary Examiner* — Yon Couso

(57) ABSTRACT

The present disclosure relates to various methods and systems to provide substitute sound (e.g., audio). One claim includes an apparatus comprising: electronic memory for storing identifying information obtained from steganographically encoded sound; an electronic processor programmed for: providing the identifying information to a remote computer, the remote computer including substitute sound corresponding to the identifying information; providing format information to the remote computer, the format information identifying a format in which the substitute sound should be formatted prior to communication of the substitute sound; and controlling receipt of substitute sound corresponding to the identifying information. Of course, other apparatus, methods and combinations are provided as well.

12 Claims, 1 Drawing Sheet

U.S. PATENT DOCUMENTS

| | | | |
|---|---|---|---|
| 4,739,398 A | 4/1988 | Thomas et al. | |
| 4,796,292 A | 1/1989 | Thomas | |
| 4,843,562 A | 6/1989 | Kenyon et al. | |
| 4,876,617 A | 10/1989 | Best et al. | |
| 4,931,871 A | 6/1990 | Kramer | |
| 4,945,412 A | 7/1990 | Kramer | |
| 4,969,041 A | 11/1990 | O'Grady et al. | |
| 4,972,471 A | 11/1990 | Gross et al. | |
| 5,019,899 A | 5/1991 | Boles et al. | |
| 5,023,929 A | 6/1991 | Call | |
| 5,031,228 A | 7/1991 | Lu | |
| 5,077,608 A | 12/1991 | Dubner | |
| 5,103,459 A | 4/1992 | Gilhousen et al. | |
| 5,113,437 A | 5/1992 | Best et al. | |
| 5,115,326 A | 5/1992 | Burgess et al. | |
| 5,134,719 A | 7/1992 | Mankovitz | |
| 5,204,902 A | 4/1993 | Reeds, III et al. | |
| 5,210,820 A | 5/1993 | Kenyon | |
| 5,243,423 A | 9/1993 | DeJean et al. | |
| 5,315,098 A | 5/1994 | Tow | |
| 5,319,735 A | 6/1994 | Preuss et al. | |
| 5,355,161 A | 10/1994 | Bird et al. | |
| 5,436,653 A | 7/1995 | Ellis et al. | |
| 5,473,631 A | 12/1995 | Moses | |
| 5,474,457 A | 12/1995 | Bromley | |
| 5,480,306 A | 1/1996 | Liu | |
| 5,481,294 A | 1/1996 | Thomas et al. | |
| 5,530,852 A | 6/1996 | Meske, Jr. et al. | |
| 5,572,653 A | 11/1996 | DeTemple et al. | |
| 5,574,519 A | 11/1996 | Manico et al. | |
| 5,574,962 A | 11/1996 | Fardeau et al. | |
| 5,579,124 A | 11/1996 | Aijala et al. | |
| 5,581,686 A * | 12/1996 | Koppolu et al. | 715/784 |
| 5,581,760 A * | 12/1996 | Atkinson et al. | 717/108 |
| 5,581,800 A | 12/1996 | Fardeau et al. | |
| 5,592,622 A * | 1/1997 | Isfeld et al. | 709/207 |
| 5,621,454 A | 4/1997 | Ellis et al. | |
| 5,640,193 A | 6/1997 | Wellner | |
| 5,710,834 A | 1/1998 | Rhoads | |
| 5,754,981 A | 5/1998 | Veeneman et al. | |
| 5,761,606 A | 6/1998 | Wolzien | |
| 5,764,763 A | 6/1998 | Jensen et al. | |
| 5,809,160 A | 9/1998 | Powell et al. | |
| 5,822,432 A | 10/1998 | Moskowitz | |
| 5,822,436 A | 10/1998 | Rhoads | |
| 5,832,119 A | 11/1998 | Rhoads | |
| 5,841,886 A | 11/1998 | Rhoads | |
| 5,841,978 A | 11/1998 | Rhoads | |
| 5,848,413 A | 12/1998 | Wolff | |
| 5,862,260 A | 1/1999 | Rhoads | |
| 5,892,900 A * | 4/1999 | Ginter et al. | 726/26 |
| 5,978,773 A | 11/1999 | Hudetz et al. | |
| 5,982,956 A | 11/1999 | Lahmi | |
| 6,064,737 A | 5/2000 | Rhoads | |
| 6,122,392 A | 9/2000 | Rhoads | |
| 6,122,403 A | 9/2000 | Rhoads | |
| 6,125,172 A | 9/2000 | August et al. | |
| 6,199,048 B1 | 3/2001 | Hudetz et al. | |
| 6,222,807 B1 | 4/2001 | Min-Jae | |
| 6,229,924 B1 | 5/2001 | Rhoads et al. | |
| 6,243,480 B1 | 6/2001 | Zhao et al. | |
| 6,278,781 B1 | 8/2001 | Rhoads | |
| 6,286,036 B1 | 9/2001 | Rhoads | |
| 6,307,949 B1 | 10/2001 | Rhoads | |
| 6,311,214 B1 | 10/2001 | Rhoads | |
| 6,324,573 B1 | 11/2001 | Rhoads | |
| 6,330,335 B1 | 12/2001 | Rhoads | |
| 6,334,721 B1 | 1/2002 | Horigane | |
| 6,381,341 B1 | 4/2002 | Rhoads | |
| 6,385,329 B1 | 5/2002 | Sharma et al. | |
| 6,408,082 B1 | 6/2002 | Rhoads et al. | |
| 6,408,331 B1 | 6/2002 | Rhoads | |
| 6,418,424 B1 * | 7/2002 | Hoffberg et al. | 706/21 |
| 6,421,070 B1 | 7/2002 | Ramos et al. | |
| 6,424,725 B1 | 7/2002 | Rhoads et al. | |
| 6,505,160 B1 | 1/2003 | Levy et al. | |
| 6,516,079 B1 | 2/2003 | Rhoads et al. | |
| 6,522,770 B1 | 2/2003 | Seder et al. | |
| 6,529,909 B1 * | 3/2003 | Bowman-Amuah | 1/1 |
| 6,535,617 B1 | 3/2003 | Hannigan et al. | |
| 6,539,095 B1 | 3/2003 | Rhoads | |
| 6,542,620 B1 | 4/2003 | Rhoads | |
| 6,542,927 B2 | 4/2003 | Rhoads | |
| 6,546,112 B1 | 4/2003 | Rhoads | |
| 6,553,129 B1 | 4/2003 | Rhoads | |
| 6,560,349 B1 | 5/2003 | Rhoads | |
| 6,567,533 B1 | 5/2003 | Rhoads | |
| 6,577,746 B1 | 6/2003 | Evans et al. | |
| 6,580,808 B2 | 6/2003 | Rhoads | |
| 6,587,821 B1 | 7/2003 | Rhoads | |
| 6,590,996 B1 | 7/2003 | Reed et al. | |
| 6,590,998 B2 | 7/2003 | Rhoads | |
| 6,611,607 B1 | 8/2003 | Davis et al. | |
| 6,614,914 B1 | 9/2003 | Rhoads et al. | |
| 6,647,128 B1 | 11/2003 | Rhoads | |
| 6,647,130 B2 | 11/2003 | Rhoads | |
| 6,650,761 B1 | 11/2003 | Rodriguez et al. | |
| 6,675,146 B2 | 1/2004 | Rhoads | |
| 6,681,028 B2 | 1/2004 | Rodriguez et al. | |
| 6,681,029 B1 | 1/2004 | Rhoads | |
| 6,694,042 B2 | 2/2004 | Seder et al. | |
| 6,694,043 B2 | 2/2004 | Seder et al. | |
| 6,700,990 B1 | 3/2004 | Rhoads | |
| 6,700,995 B2 | 3/2004 | Reed | |
| 6,704,869 B2 | 3/2004 | Rhoads et al. | |
| 6,718,046 B2 | 4/2004 | Reed et al. | |
| 6,718,047 B2 | 4/2004 | Rhoads | |
| 6,721,440 B2 | 4/2004 | Reed et al. | |
| 6,728,390 B2 | 4/2004 | Rhoads et al. | |
| 6,760,463 B2 | 7/2004 | Rhoads | |
| 6,763,123 B2 | 7/2004 | Reed et al. | |
| 6,768,809 B2 | 7/2004 | Rhoads et al. | |
| 6,775,392 B1 | 8/2004 | Rhoads | |
| 6,782,115 B2 | 8/2004 | Decker et al. | |
| 6,798,894 B2 | 9/2004 | Rhoads | |
| 6,804,379 B2 | 10/2004 | Rhoads | |
| 6,813,366 B1 | 11/2004 | Rhoads | |
| 6,829,368 B2 | 12/2004 | Meyer et al. | |
| 6,869,023 B2 | 3/2005 | Hawes | |
| 6,879,701 B1 | 4/2005 | Rhoads | |
| 6,917,691 B2 | 7/2005 | Evans et al. | |
| 6,917,724 B2 | 7/2005 | Seder et al. | |
| 6,920,232 B2 | 7/2005 | Rhoads | |
| 6,931,451 B1 | 8/2005 | Logan et al. | |
| 6,941,275 B1 | 9/2005 | Swierczek | |
| 6,947,571 B1 | 9/2005 | Rhoads et al. | |
| 6,965,873 B1 | 11/2005 | Rhoads | |
| 6,968,057 B2 | 11/2005 | Rhoads | |
| 6,968,337 B2 | 11/2005 | Wold | |
| 6,973,669 B2 | 12/2005 | Daniels | |
| 6,975,746 B2 | 12/2005 | Davis et al. | |
| 6,985,600 B2 | 1/2006 | Rhoads et al. | |
| 6,987,862 B2 | 1/2006 | Rhoads | |
| 6,988,202 B1 | 1/2006 | Rhoads et al. | |
| 6,996,252 B2 | 2/2006 | Reed et al. | |
| 7,003,731 B1 | 2/2006 | Rhoads et al. | |
| 7,010,144 B1 | 3/2006 | Davis et al. | |
| 7,024,016 B2 | 4/2006 | Rhoads et al. | |
| 7,027,614 B2 | 4/2006 | Reed | |
| 7,035,427 B2 | 4/2006 | Rhoads | |
| 7,044,395 B1 | 5/2006 | Davis et al. | |
| 7,050,603 B2 | 5/2006 | Rhoads et al. | |
| 7,051,086 B2 | 5/2006 | Rhoads et al. | |
| 7,054,465 B2 | 5/2006 | Rhoads | |
| 7,058,697 B2 | 6/2006 | Rhoads | |
| 7,062,069 B2 | 6/2006 | Rhoads | |
| 7,076,084 B2 | 7/2006 | Davis et al. | |
| 7,095,871 B2 | 8/2006 | Jones et al. | |
| 7,111,170 B2 | 9/2006 | Hein et al. | |
| 7,113,614 B2 | 9/2006 | Rhoads | |
| 7,123,740 B2 | 10/2006 | McKinley | |
| 7,127,744 B2 | 10/2006 | Levy | |
| 7,130,831 B2 * | 10/2006 | Howard et al. | 705/57 |
| 7,136,502 B2 | 11/2006 | Rhoads et al. | |
| 7,139,408 B2 | 11/2006 | Rhoads et al. | |
| 7,158,654 B2 | 1/2007 | Rhoads | |
| 7,159,116 B2 * | 1/2007 | Moskowitz | 713/176 |

| | | |
|---|---|---|
| 7,164,413 B2 | 1/2007 | Davis et al. |
| 7,164,780 B2 | 1/2007 | Brundage et al. |
| 7,171,016 B1 | 1/2007 | Rhoads |
| 7,171,018 B2 | 1/2007 | Rhoads et al. |
| 7,174,031 B2 | 2/2007 | Rhoads et al. |
| 7,174,293 B2 | 2/2007 | Kenyon et al. |
| 7,177,443 B2 | 2/2007 | Rhoads |
| 7,185,201 B2 | 2/2007 | Rhoads et al. |
| 7,190,971 B1 | 3/2007 | Kawamoto |
| 7,194,752 B1 | 3/2007 | Kenyon et al. |
| 7,209,571 B2 | 4/2007 | Davis et al. |
| 7,209,573 B2 | 4/2007 | Evans et al. |
| 7,213,757 B2 | 5/2007 | Jones et al. |
| 7,224,819 B2 | 5/2007 | Levy et al. |
| 7,224,995 B2 | 5/2007 | Rhoads |
| 7,248,715 B2 | 7/2007 | Levy |
| 7,248,717 B2 | 7/2007 | Rhoads |
| 7,251,475 B2 | 7/2007 | Kawamoto |
| 7,261,612 B1 | 8/2007 | Hannigan et al. |
| 7,266,704 B2 | 9/2007 | Levy |
| 7,289,643 B2 | 10/2007 | Brunk et al. |
| 7,302,574 B2 | 11/2007 | Conwell et al. |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,333,957 B2 | 2/2008 | Levy et al. |
| 7,349,552 B2 | 3/2008 | Levy et al. |
| 7,359,528 B2 | 4/2008 | Rhoads |
| 7,362,781 B2 | 4/2008 | Rhoads |
| 7,362,879 B2 | 4/2008 | Evans et al. |
| 7,369,676 B2 | 5/2008 | Hein, III |
| 7,369,678 B2 | 5/2008 | Rhoads |
| 7,372,976 B2 | 5/2008 | Rhoads et al. |
| 7,377,421 B2 | 5/2008 | Rhoads |
| 7,391,880 B2 | 6/2008 | Reed et al. |
| 7,406,214 B2 | 7/2008 | Rhoads et al. |
| 7,415,129 B2 | 8/2008 | Rhoads |
| 7,424,131 B2 | 9/2008 | Alattar et al. |
| 7,427,030 B2 | 9/2008 | Jones et al. |
| 7,433,491 B2 | 10/2008 | Rhoads |
| 7,437,430 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,457,464 B2 | 11/2008 | Stevens et al. |
| 7,460,726 B2 | 12/2008 | Levy et al. |
| 7,461,136 B2 | 12/2008 | Rhoads |
| 7,466,840 B2 | 12/2008 | Rhoads |
| 7,486,799 B2 | 2/2009 | Rhoads |
| 7,499,566 B2 | 3/2009 | Rhoads |
| 7,502,759 B2 | 3/2009 | Hannigan et al. |
| 7,505,605 B2 | 3/2009 | Rhoads et al. |
| 7,508,955 B2 | 3/2009 | Carr et al. |
| 7,515,733 B2 | 4/2009 | Rhoads |
| 7,522,728 B1 | 4/2009 | Rhoads |
| 7,536,034 B2 | 5/2009 | Rhoads et al. |
| 7,537,170 B2 | 5/2009 | Reed et al. |
| 7,545,951 B2 | 6/2009 | Davis et al. |
| 7,545,952 B2 | 6/2009 | Brundage et al. |
| 7,562,392 B1 | 7/2009 | Rhoads et al. |
| 7,564,992 B2 | 7/2009 | Rhoads |
| RE40,919 E | 9/2009 | Rhoads |
| 7,587,601 B2 | 9/2009 | Levy et al. |
| 7,587,602 B2 | 9/2009 | Rhoads |
| 7,590,259 B2 | 9/2009 | Levy et al. |
| 7,593,576 B2 | 9/2009 | Meyer et al. |
| 7,602,978 B2 | 10/2009 | Levy et al. |
| 7,606,390 B2 | 10/2009 | Rhoads |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,693,965 B2 | 4/2010 | Rhoads |
| 7,697,719 B2 | 4/2010 | Rhoads |
| 7,711,143 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,902 B2 | 7/2010 | Rhoads |
| 7,760,905 B2 | 7/2010 | Rhoads et al. |
| 7,762,468 B2 | 7/2010 | Jones et al. |
| 7,773,770 B2 | 8/2010 | Evans et al. |
| 7,787,653 B2 | 8/2010 | Rhoads |
| 7,792,325 B2 | 9/2010 | Rhoads et al. |
| 7,805,500 B2 | 9/2010 | Rhoads |
| 7,822,225 B2 | 10/2010 | Alattar |
| 7,837,094 B2 | 11/2010 | Rhoads |
| 2001/0026377 A1 | 10/2001 | Ikegami |
| 2001/0026629 A1 | 10/2001 | Oki |
| 2001/0034705 A1 | 10/2001 | Rhoads et al. |
| 2001/0055407 A1 | 12/2001 | Rhoads |
| 2002/0009208 A1 | 1/2002 | Alattar et al. |
| 2002/0047946 A1 | 4/2002 | Yuen et al. |
| 2002/0059384 A1 | 5/2002 | Kaars |
| 2002/0092017 A1 | 7/2002 | Klosterman et al. |
| 2002/0131076 A1 | 9/2002 | Davis |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0040326 A1 | 2/2003 | Levy et al. |
| 2003/0040957 A1 | 2/2003 | Rodriguez et al. |
| 2003/0056103 A1 | 3/2003 | Levy et al. |
| 2003/0105730 A1 | 6/2003 | Rhoads et al. |
| 2003/0130954 A1 | 7/2003 | Carr et al. |
| 2003/0174861 A1 | 9/2003 | Levy et al. |
| 2003/0217005 A1* | 11/2003 | Drummond et al. ............ 705/43 |
| 2004/0005093 A1 | 1/2004 | Rhoads |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0062426 A1 | 3/2006 | Levy et al. |
| 2006/0120560 A1 | 6/2006 | Davis et al. |
| 2006/0174348 A1 | 8/2006 | Rhoads et al. |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0189533 A1 | 8/2007 | Rhoads |
| 2007/0276841 A1 | 11/2007 | Rhoads et al. |
| 2007/0276928 A1 | 11/2007 | Rhoads et al. |
| 2007/0294173 A1 | 12/2007 | Levy et al. |
| 2008/0121728 A1 | 5/2008 | Rodriguez |
| 2008/0125083 A1 | 5/2008 | Rhoads |
| 2008/0133555 A1 | 6/2008 | Rhoads et al. |
| 2008/0139182 A1 | 6/2008 | Levy et al. |
| 2008/0140433 A1 | 6/2008 | Levy et al. |
| 2008/0273747 A1 | 11/2008 | Rhoads |
| 2008/0292134 A1 | 11/2008 | Sharma et al. |
| 2009/0012944 A1 | 1/2009 | Rodriguez et al. |
| 2009/0060269 A1 | 3/2009 | Rhoads |
| 2009/0077604 A1 | 3/2009 | Levy et al. |
| 2009/0116687 A1 | 5/2009 | Rhoads et al. |
| 2009/0125475 A1 | 5/2009 | Rhoads et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |
| 2010/0045816 A1 | 2/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Ellingson et al. |
| 2010/0172540 A1 | 7/2010 | Davis et al. |
| 2010/0198941 A1 | 8/2010 | Rhoads |
| 2010/0226525 A1 | 9/2010 | Levy et al. |

| | | | |
|---|---|---|---|
| 2011/0007936 | A1 | 1/2011 | Rhoads |
| 2011/0026777 | A1 | 2/2011 | Rhoads et al. |
| 2011/0051998 | A1 | 3/2011 | Rhoads |

FOREIGN PATENT DOCUMENTS

| | | |
|---|---|---|
| EP | 0581317 | 2/1994 |
| EP | 0642060 | 3/1995 |
| JP | 05-037795 | 2/1993 |
| JP | 8-050598 | 2/1996 |
| JP | 3949679 | 7/2007 |
| WO | WO 94/00842 | 1/1994 |
| WO | WO 95/10813 | 4/1995 |
| WO | WO 95/14289 | 5/1995 |
| WO | WO 97/02522 | 1/1997 |

OTHER PUBLICATIONS

Aust, D., "Augmenting Paper Documents with Digital Information in a Mobile Environment," MS Thesis, University of Dortmund, Department of Computer Graphics, Sep. 3, 1996, 46 pages.

Anonymous, Internet-On-A-Disk #7, Dec. 3, 1994, 10 pages.

Arai et al, "Retrieving Electronic Documents with Real-World Objects on InteractiveDESK," UIST '95, Nov. 14, 1995, pp. 37-38.

Arai, InteractiveDESK: A Computer-Augmented Desk Which Responds to Operations on Real Objects, CHI 95, May 7, 1995, pp. 141-142.

Bender et al., "Techniques for data hiding," Proc. SPIE, vol. 2420, pp. 164-173, 1995.

Berners-Lee, L. Masinter, M. McCahill, Uniform Resource Locators (URL), Network Working Group, Request for Comments 1738, Dec. 1994, 25 pages.

Berners-Lee, The Original HTTP as defined in 1991, 2 pages.

Blackburn, "A Tool for Content Based Navigation of Music," ACM Multimedia 1998, 14 pages.

deRoure, "Multiagent System for Content Based Navigation of Music." ACM Multimedia, Oct. 99, 4 pp.

Digimarc, "Frequently Asked Questions About Digimarc Signature Technology," Aug. 1995.

Foote, "An Overview of Audio Information Retrieval," Multimedia Systems, v.7 n.1, p.2-10, Jan. 1999.

Ghias et al. Query by Humming: Musical Information Retrieval In An Audio Database. In ACM Multimedia, pp. 231-236, Nov. 1995.

Hara et al., "An Improved Method of Embedding Data Into Pictures by Modulo Masking," IEEE Transactions on Communications, 1988 vol. COM-36, No. 3, pp. 315-331.

Hartung et al., Digital Watermarking of Raw and Compressed Video, Proc. SPIE 2952, Digital Compression Technologies and Systems for Video Communications, Oct. 1996, pp. 205-213.

Highwater FBI Ltd., "FBI Presentation: Image Copyright Protection Software," Jul. 1995.

Highwater FBI, "Copyright Protection for Digital Images, Digital Fingerprinting from FBI," Brochure, 4 pp., 1995.

Hill, "Simultaneous Subliminal Signalling in Conventional Sound Circuits," BBC Engineering, No. 90, pp. 14-25, 1972.

Ibrahim, "World-Wide Algorithm Animation", Computer Networks and ISDN Systems, North Holland Publishing, Nov. 1994, pp. 255-265.

Itoh, et al., "A Method of Concealed Image for Bi-Level Image," Technical Research Report of the Institute of Electronics, Information and Communication Engineering, Institute of Electronics, Information and Communication Engineering, Japan, vol. 90, No. 152, Aug. 1990, pp. 83-86 (English translation not available).

Johnson, et al., "Bridging the Paper and Electronic Worlds: The Paper User Interface", Interchi '93, pp. 507-512. Apr. 1993.

Kageyama et al, Melody Retrieval with Humming, Proceedings of Int. Computer Music Conference (ICMC), 1993, pp. 349-351.

Koch et al, "Copyright Protection for Multimedia Data," Proc. of the Int. Conf. On Digital Media and Electronic Publishing, Leeds, U.K., 15 pages, Dec., 1994.

Komatsu, N., "Information Security for Facsimile Communication," Journal of the Institute of Image Electronics Engineers of Japan, 1990, vol. 19 No. 4, pp. 229-235. (English translation not available).

Lin, et al., "Generating Robust Digital Signature for Image/Video Authentication," Proc. Multimedia and Security workshop at ACM MULTIMEDIA'98, Sep. 1, 1998, pp. 49-54.

Matsutani, "The Construction of Copyright-Protected Image Data Technical Report of IEICE," ISEC94-58, pp. 59-68, 1995. (This Matsutani document is erroneously cited as "Matsuya, 'Method of Composing Document and Image Data having Copyright Protection Function,' Report on Technical Study of the Institute of Electronics, Information and Communication Engineers, ISEC94-58, Mar. 17, 1995, pp. 59-68" on p. 3 of the Mar. 24, 2006 Notice of Reason(s) for Rejection in the JP 2004-224727 application.).

Mockapetris, Domain Names- Concepts and Facilities, Network Working Group, Request for Comments 1034, Nov. 1987, 56 pages.

Mockapetris, Domain Names- Implementation and Specification, Network Working Group, Request for Comments 1034, Nov. 1987, 56 pages.

Muscle Fish press release, Muscle Fish's Audio Search Technology to be Encapsulated into Informix Datablade Module, Jul. 10, 1996.

Namba, S. et al., "A Program Identification Code Transmission System Using Low-Frequency Audio Signals," NHK Laboratories Note, Ser. No. 314, Mar. 1985, 14 pages.

Newman, William, et al. "A Desk Supporting Computer-Based Interaction with paper Documents," ACM Conference on Human Factors in Computing Systems (CHI '92) May 3-7, 1992, pp. 587-592.

Matsui et al., "Video-Steganography: How to Secretly Embed a Signature in a Picture," IMA Intellectual Property Project Proceedings, Jan. 1994, vol. 1, Issue 1, pp. 187-205.

Peairs, "Iconic Paper," Proceedings of the Third International Conference on Document Analysis and Recognition (ICDAR '95), pp. 1174-1179, 1995.

Pitas et al., "Applying Signatures on Digital Images," IEEE Workshop on Nonlinear Image and Signal Processing, Neos Marmaras, Greece, pp. 460-463, Jun. 1995.

Rao, et al., "Protofoil: Storing and Finding the Information Worker's Paper Documents in an Electronic File Cabinet," Human Factors in Computing Systems (CHI '94), pp. 180-186, Boston, MA, Apr. 1994.

Roy, "Wearable Audio Computer—A Survey of Interaction Techniques," MIT Media Lab, 1997, 11 pages.

Smith, et al, "Music Information Retrieval Using Audio Input." Proc AAAI Spring Symposium on Intelligent Integration and Use of Text, Image, Video and Audio *Corpora*, pp. 12-16, 1996.

Steele, R. et al., "Embedding Data in Speech using Scrambling Techniques," IEEE International Conference on Acoustics, Speech and Signal Processing, vol. 3, pp. 1801-1804; May 1982.

Steele, R. et al., "Simultaneous Transmission of Speech and Data Using Code-Breaking Techniques," The Bell System Tech. Jour., vol. 60, No. 9, pp. 2081-2105, Nov. 1981.

Szepanski, "A Signal Theoretic Method for Creating Forgery-Proof Documents for Automatic Verification," in Proceedings of the 1979 Carnahan Conference on Crime Countermeasures, University of Kentucky, Lexington, KY, May 16-18, 1979, pp. 101-109.

Tanaka et al., "A Visual Retrieval System with Private Information for Image Database," International Conference on DSP Applications and Technology, Oct. 1991, pp. 415-421.

ten Kate, et al., "Digital Audio Carrying Extra Information," Philips Research Labs, pp. 1097-1100, IEEE 1990.

Wagner, "Fingerprinting," 1983 IEEE, pp. 18-22.

Whittaker, et al., "Back to the Future: Pen and Paper Technology Supports Complex Group Coordination," CHI '95, Conference on Human Factors in Computing Systems, Denver, Colorado (May 7-11, 1995) (text copy obtained from ACM).

Wold et al, Content-Based Classification, Search, and Retrieval of Audio, IEEE Multimedia Magazine, Fall, 1996, pp. 27-36.

Worring, "Hyperdocument Generation Using OCR and Icon Detection," Proc. 3d Int. Conf. on Doc. Analysis and Recognition, Aug. 14, 1995, 5 pages.

Xydeas et al., "Embedding Data Into Pictures by Modulo Masking," IEEE Transactions on Communications, 1984, vol. COM-32, No. 1, pp. 56-69.

Zhao, et al., "Embedding Robust Labels into Images for Copyright Protection," Proceedings of International Congress on Intellectual Property Rights for Specialized Information, Knowledge and New Technology, Aug. 21, 1995.

Feb. 17, 2009 Notice of Intent to Issue Ex Parte Reexamination Certificate; Aug. 29, 2008 Amendment; Jul. 3, 2008 Office Action in Ex Parte Reexamination; Oct. 16, 2007 Determination—Reexamination Ordered; Jul. 26, 2007 "Request for Ex Party Reexamination"; all from Reexam No. 90/008,779 (Reexam of US Pat. No. 6,199,048; Ex Parte Reexamination Certificate No. 6,199,048 C1 issued on Jun. 9, 2009).

U.S. Appl. No. 60/000,442, filed Jun. 20, 1995, (Hudetz).

U.S. Appl. No. 09/343,104, filed Jun. 29, 1999, Tony F. Rodriguez, et al.

U.S. Appl. No. 09/343,101, filed Jun. 29, 1999, Bruce L. Davis, et al.

U.S. Appl. No. 09/413,117, filed Oct. 6, 1999, Geoffrey B. Rhoads.

U.S. Appl. No. 09/482,749, filed Jan. 13, 2000, Geoffrey B. Rhoads.

U.S. Appl. No. 09/507,096, filed Feb. 17, 2000, Geoffrey B. Rhoads, et al.

U.S. Appl. No. 09/538,493, filed Mar. 30, 2000, Geoffrey B. Rhoads.

U.S. Appl. No. 09/552,998, filed Apr. 19, 2000, Tony F. Rodriguez, et al.

U.S. Appl. No. 09/567,405, filed May 8, 2000, Geoffrey B. Rhoads, et al.

U.S. Appl. No. 09/629,649, filed Aug. 1, 2000, J. Scott Carr, et al.

U.S. Appl. No. 09/633,587, filed Aug. 7, 2000, Geoffrey B. Rhoads, et al.

U.S. Appl. No. 09/689,289, filed Oct. 11, 2000, Geoffrey B. Rhoads, et al.

U.S. Appl. No. 09/697,009, filed Oct. 25, 2000, Bruce L. Davis, et al.

U.S. Appl. No. 09/697,015, filed Oct. 25, 2000, Bruce L. Davis, et al.

U.S. Appl. No. 12/912,461, filed Oct. 26, 2010, Adnan M. Alatter.

U.S. Appl. No. 12/953,190, filed Nov. 23, 2010, Geoffrey B. Rhoads.

* cited by examiner

SUBSTITUTING OR REPLACING COMPONENTS IN SOUND BASED ON STEGANOGRAPHIC ENCODING

RELATED APPLICATION DATA

This application is a continuation of U.S. patent Ser. No. 12/107,484, filed Apr. 22, 2008 (U.S. Pat. No. 7,773,770), which is a continuation of U.S. patent Ser. No. 11/739,534, filed Apr. 24, 2007 (U.S. Pat. No. 7,362,879), which is a continuation of U.S. patent application Ser. No. 11/145,515, filed Jun. 3, 2005 (U.S. Pat. No. 7,209,573), which is a continuation of U.S. patent application Ser. No. 10/448,544, filed May 29, 2003 (U.S. Pat. No. 6,917,691), which is a continuation of U.S. patent application Ser. No. 09/473,396, filed Dec. 28, 1999 (U.S. Pat. No. 6,577,746). Each of these patent documents is hereby incorporated by reference.

FIELD OF THE INVENTION

The present invention relates to data processing, and more particularly relates to use of watermark technology for object substitution.

BACKGROUND AND SUMMARY OF THE INVENTION

Object linking and embedding ("OLE," sometimes also known as dynamic data exchange, or "DDE") is a well-known data processing construct by which a first digital object (e.g., a graph) can be embedded within a second digital object (e.g., a word processing document). In some embodiments, the embedding is static. That is, once the embedding takes place, subsequent changes to the first digital object (e.g., the graph) are not reflected in the second, composite digital object (e.g., the document). In other embodiments, the embedding is dynamic (and thus more commonly termed linking rather than embedding). In such arrangements, if the graph is changed, the document is automatically updated to incorporate the latest version of the graph.

The technology underlying OLE is sophisticated, but is well understood by artisans in the field. Reference may be made to the many patents (e.g., U.S. Pat. Nos. 5,581,760 and 5,581,686) and reference books (e.g., Brockschmidt, *Inside OLE* 2, Microsoft Press, Redmond, Wash., 1994) on the subject for further details.

In accordance with the present invention, OLE-like principles are implemented using watermark data in digital objects in order to effect object linking or embedding.

In one illustrative embodiment, a photocopier scans an original paper document to produce image data. This image data is analyzed for the presence of watermark data that identifies the graphic(s) on the document. With this watermark identifier, the photocopier can query a remote image database for pristine image data corresponding to the graphic(s) on the document. This pristine data can be relayed from the remote database to the photocopier and substituted into the scanned image data. Output printed from the photocopier is thus based, at least in part, on pristine image data, rather than on image data that has been subjected to various corruption mechanisms (e.g., degradation of the original paper document, artifacts due to scanning, etc.).

The foregoing and other features and advantages of the present invention will be more readily apparent from the following detailed description, which proceeds with reference to the accompanying drawings.

DETAILED DESCRIPTION

Figure 1:
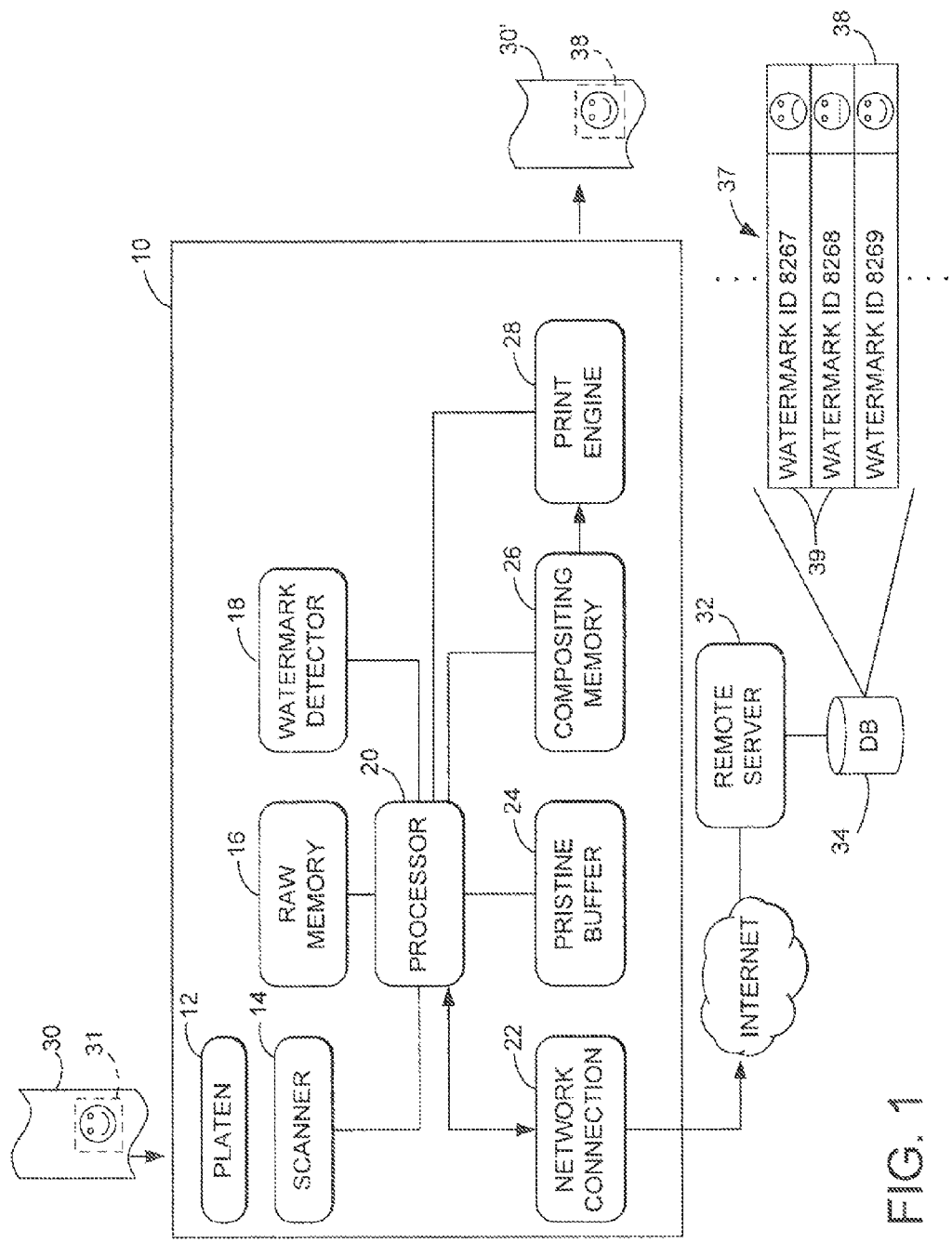
FIG. 1 shows an apparatus according to one embodiment of the present invention.

Referring to FIG. 1, an illustrative embodiment of the present invention is a photocopier 10. The photocopier includes a platen 12, a scanner assembly 14, a raw data memory 16, a watermark decoder 18, a processor 20, a network connection 22, a pristine image buffer 24, a compositing memory 26, and a reproduction engine 28.

A paper document, such as document 30, is placed on platen 12, and scanner assembly 14 is activated to generate scan data corresponding to the document. The scanner assembly is conventional and may include a linear array of CCD or CMOS sensor elements that optically scans along an axis of the platen to generate 2D image data. Alternatively, the scanner can comprise a 2D array of sensor elements onto which an image of the document is projected through one or more lenses. In the illustrated embodiment, the document 30 includes a picture 31 that is encoded with a plural-bit digital watermark. Document 30 may be referred to as a compound document since it incorporates plural components (e.g., text and picture).

The scan data from the scanner assembly 14 is stored in the raw data memory 16, where it is analyzed for the presence of watermark data by the watermark decoder 18.

There are many different techniques by which imagery can be digitally watermarked and decoded. One is the Digimarc watermark system detailed, e.g., in U.S. Pat. No. 5,862,260, and in pending application Ser. No. 09/452,023, filed Nov. 30, 1999 (now U.S. Pat. No. 6,408,082), the disclosures of which are incorporated herein by reference. A great variety of other systems are known. All that is required is that the watermark permit the conveyance of plural-bit auxiliary data without objectionable image degradation.

Upon detection of the watermark in picture 31, the processor 20 is programmed to initiate communication with a remote server 32 (e.g., over the internet) through the network connection 22. The programmed processor sends to the server a query message identifying the detected watermark (which may be, e.g., an identifier of 16-64 bits). A database 34 at the server 32 searches its records 37 for a digital object indexed by that watermark ID 39 and, if located, causes a pristine version of the object 38 (in this case a pristine version of the picture 31) to be sent to the photocopier.

In the embodiment illustrated, the database has the pristine version of the object stored within the database record for that watermark ID, and relays same directly back to the photocopier. In other embodiments, the object itself is not stored in the database. Instead, the database stores (in a record associated with the watermark ID) the address of a remote data repository at which the pristine object is stored. In this case the object server 32 can transmit an instruction to the remote repository (e.g., again over the internet), requesting the remote repository to provide the pristine object. The object can be sent directly from the remote data repository to the photocopier, or may be relayed through the object server 32. In any case, the pristine object may be provided in TIFF, JPEG, GIF, or other format. (In some embodiment, the request signal from the photocopier specifies the format desired, or may specify plural formats that the photocopier can accept, and the pristine object is then output by the server 32 or remote repository in such a format. In other embodiments, the request signal from the photocopier does not include any format data.)

In some embodiments, the object server 32 can be of the sort more particularly detailed in copending applications 60/164,619 (filed Nov. 10, 1999), and Ser. No. 09/343,104 (filed Jun. 29, 1999), the disclosures of which are incorporated herein by reference.

In addition to detecting the ID of any watermark in the scanned image data, the photocopier's watermark detector also discerns the placement of the watermarked picture within the document image, and its state (e.g., size, rotation, etc.), and produces corresponding state information. In some embodiments, this state information is passed to the object server 32, permitting the pristine object 38 to be sized/rotated/etc. (e.g., by the object server) to match the object detected in the document image. In other embodiments, a generic version of the pristine object is passed back to the photocopier, and the processor 20 attends to sizing, rotating, etc., of the pristine picture 38 as necessary to match that of the original picture 31.

In some embodiments the picture 31 in the paper document has been cropped. (The watermark can nonetheless be detected from the cropped image.) When the pristine picture 38 is received from the remote location, it can be pattern-matched to the picture 31 detected in the original document to determine the cropping boundaries (if any), and corresponding cropping of the pristine picture can be effected.

Once the foregoing scaling/rotation/cropping, etc., adjustments (if any) have been made on the pristine picture 38 stored in buffer 24, the processed pristine picture is combined with the original document scan data in compositing memory 26, yielding a composite document image that includes the pristine picture data 38 in lieu of the scanned picture 31. (The substitution of the pristine picture for the original picture data can be accomplished by various known image processing techniques, including masking, overwriting, etc.) The composite document image is then passed to the reproduction engine 28 to produce a hard-copy output (i.e., an enhanced compound document 30') in the conventional manner. (The reprographic engine 28 can take many different forms including, e.g., xerography, ink-jet printing, etc.)

The pristine picture 38 received from the server 32 can, itself, be watermarked or not. If watermarked, the watermark will usually convey the same payload information as the watermark in the original picture 31, although this need not always be the case. In other embodiments, the pristine picture 38 received from the remote server 32 has no watermark. In such case the pristine picture can be substituted into the compound document 30 in its unwatermarked state. Alternatively, the apparatus 10 can embed a watermark into the picture prior to (or as part of) the substitution operation.

If the substituted picture is watermarked, this permits later watermark-based enhancement or updating. For example, if the enhanced compound document 30' including the pristine picture 38 is printed by the photocopier, and the resulting photocopy is thereafter photocopied, the latter photocopying operation can again substitute pristine picture data for the scanned picture data produced by the second photocopier's scanner. Moreover, in applications where it is appropriate for a picture to be updated with the latest version whenever printed, the watermarking of the picture 38 permits substitution of a latest version whenever the document is scanned for printing.

In other situations, it is desirable for the picture 38 included in the enhanced compound document 30' to be unwatermarked. This is the case, for example, in certain archival applications where it is important that the document 30' not be changed after archiving. By assuring that the picture 38 is not watermarked, inadvertent changing of the picture in subsequent photocopying can be avoided. (In cases where the pristine image 38 is provided from server 32 in a watermarked state, the photocopier may remove or disable the watermark in response to corresponding instructions from a user through a user interface or the like.)

From the foregoing, it will be recognized that the illustrative embodiment can produce "photocopies" that are better than the "originals." This is accomplished by watermark-based substitution of pristine digital objects to replace less pristine counterparts.

Having described and illustrated the principles of our invention with reference to an illustrative embodiment, it will be recognized the invention is not so limited.

For example, while the invention is particularly illustrated with reference to a photocopier, the same principles are equally applicable in other systems, including personal computers (e.g., in conjunction with image editing software, such as Adobe Photoshop). In such case the input image data needn't come from a scanner but may come, e.g., from a digital file, from a network location, etc.

Likewise, while the invention is particularly illustrated with reference to picture (i.e., graphic) data, the same principles are equally applicable in connection with other data types, such as video, sound, text, etc. Moreover, the reference to "documents" is illustrative only; the invention can similarly be employed with any compound object that includes a watermarked component—whether in digital or analog form.

While the detailed embodiment is described as using separate raw data memory 16, pristine image buffer 24, and compositing memory 26, more typically some or all of these functions are served by a single memory, which may be a computer system's main RAM memory.

Likewise, while the detailed embodiment employs a processor 20 programmed in accordance with software instructions (e.g., stored in a memory or on a storage medium), in other embodiments some or all of the described functionality can be achieved using dedicated hardware (e.g., ASICs), or programmable hardware (e.g., PLAs).

Still further, while the invention is illustrated with reference to an arrangement in which a document includes a single watermarked photograph, it will be recognized that plural such watermarked components may be present in a compound document, and the system may be arranged to obtain pristine versions of each, and edit/composite same as necessary as to recreate an enhanced version of the original document.

Moreover, while the illustrative embodiment contemplates that a watermarked photograph may be a component of the original document, in other embodiments the watermarked object may comprise the entirety of the original document.

While reference has been made to substitution of pristine image components, in some embodiments it may be desirable to substitute components that are not "pristine." Indeed, in some embodiments an object may be substituted that is visually dissimilar to the original object. Consider artwork for a Christmas card. The artwork may include a watermarked "generic" corporate logo. When encountered by a computer according to the present invention, the generic logo may be replaced with a logo corresponding to the corporate owner of the computer. In such case, the substitute imagery may be stored within the computer itself, obviating the need for any network connection. The registry database maintained by the computer's operating system may include keys defined by watermark IDs. When a watermark ID is encountered, the registry database can be consulted to identify a corresponding graphic that can be substituted into the object being processed. If none is found, the watermark ID can be passed to the remote server 32.

While, for expository convenience, the illustrative embodiment was described as always substituting pristine data when available, more typically this is a function that would be enabled or disabled by an operator of the device, e.g., by an appropriate switch, button, or user interface control. In some embodiments, the device may be arranged to query the user when substitution of a pristine component is possible, in some cases presenting the user with a depiction of the image component proposed to be substituted.

The illustrative embodiment may be said to employ watermark-based object embedding, since the hard-copy output is static (i.e., cannot change) after printing. In other embodiments, the enhanced compound document 30' is not printed, but stored. Each time the compound document is utilized (e.g., opened for editing, or printed), any watermarked component(s) therein can be updated to include the latest-available version(s) of the watermarked component(s). In such case, the document may be said to employ watermark-based object linking.

In view of the many embodiments to which the principles of our invention may be applied, it should be apparent that the detailed embodiment is illustrative only and should not be taken as limiting the scope of our invention. Rather, we claim as our invention all such modifications as may fall within the scope and spirit of the following claims, and equivalents thereto.

What is claimed is:

1. An apparatus comprising:
   electronic memory for storing identifying information obtained from steganographically encoded sound;
   an electronic processor programmed for:
      providing the identifying information to a remote computer, wherein the remote computer is configured to include substitute sound corresponding to the identifying information;
      providing format information to the remote computer, wherein the format information identifies a format in which the substitute sound should be formatted prior to communication of the substitute sound; and
      controlling receipt of substitute sound corresponding to the identifying information.

2. The apparatus of claim 1, wherein the electronic processor is further programmed for providing state information to the remote computer.

3. The apparatus of claim 1, wherein the electronic processor is further programmed for providing a request for substitute sound.

4. The apparatus of claim 1, wherein the electronic processor is further programmed for providing a request to provide substitute sound corresponding to the identifying information directly to a remotely located consumer device.

5. A method comprising:
   storing identifying information obtained from steganographically encoded sound;
   providing the identifying information to a remote computer, wherein the remote computer is configured to include substitute sound corresponding to the identifying information;
   providing format information to the remote computer, wherein the format information identifies a format in which the substitute sound should be formatted prior to communication of the substitute sound; and
   controlling receipt of substitute sound corresponding to the identifying information.

6. The method of claim 5, further comprising providing state information to the remote computer.

7. The method of claim 5, further comprising providing a request for substitute sound.

8. The method of claim 5, further comprising providing a request to provide substitute sound corresponding to the identifying information directly to a remotely located consumer device.

9. A non-transitory computer readable medium comprising instructions stored therein, that if executed by a computing device, cause the computing device to perform operations comprising:
   storing identifying information obtained from steganographically encoded sound;
   providing the identifying information to a remote computer, wherein the remote computer is configured to include substitute sound corresponding to the identifying information;
   providing format information to the remote computer, wherein the format information identifies a format in which the substitute sound should be formatted prior to communication of the substitute sound; and
   controlling receipt of substitute sound corresponding to the identifying information.

10. The non-transitory computer readable medium of claim 9, wherein the operations further comprise providing state information to the remote computer.

11. The non-transitory computer readable medium of claim 9, wherein the operations further comprise providing a request for substitute sound.

12. The non-transitory computer readable medium of claim 9, wherein the operations further comprise providing a request to provide substitute sound corresponding to the identifying information directly to a remotely located consumer device.

* * * * *

UNITED STATES PATENT AND TRADEMARK OFFICE
CERTIFICATE OF CORRECTION

| | |
|---|---|
| PATENT NO. | : 8,036,420 B2 |
| APPLICATION NO. | : 12/853964 |
| DATED | : October 11, 2011 |
| INVENTOR(S) | : Evans et al. |

It is certified that error appears in the above-identified patent and that said Letters Patent is hereby corrected as shown below:

Page 4, item (56), under "Other Publications", in Column 1, Line 18, delete "deRoure," and insert -- DeRoure, --.

Page 4, item (56), under "Other Publications", in Column 1, Line 18, delete ""Multiagent" and insert -- "A Multiagent --.

Page 4, item (56), under "Other Publications", in Column 1, Line 19, delete "Music."" and insert -- Music," --.

Page 4, item (56), under "Other Publications", in Column 1, Line 47, delete "507-512." and insert -- 507-512, --.

Page 4, item (56), under "Other Publications", in Column 2, Line 5, delete "IEICE,"" and insert -- IEICE,"--.

Page 4, item (56), under "Other Publications", in Column 2, Line 37, delete "Computer" and insert -- Computing --.

Page 4, item (56), under "Other Publications", in Column 2, Line 44, delete "vol. 3," and insert -- vol. 7, --.

Page 4, item (56), under "Other Publications", in Column 2, Line 65, delete "3d" and insert -- $3^{rd}$ --.

Page 4, item (56), under "Other Publications", in Column 2, Line 73, delete "Technology," and insert -- Technologies, --.

Page 5, item (56), under "Other Publications", in Column 1, Line 4, delete "Ex Party" and insert -- Ex Parte --.

Signed and Sealed this
Twenty-fourth Day of April, 2012

David J. Kappos
*Director of the United States Patent and Trademark Office*

Page 5, item (56), under "Other Publications", in Column 2, Line 13, delete "Adnan M. Alatter." and insert -- Adnan M. Alattar. --.